United States Patent [19]

Terano et al.

[11] Patent Number: 4,970,186
[45] Date of Patent: Nov. 13, 1990

[54] SOLID CATALYST COMPONENT FOR THE POLYMERIZATION OF OLEFINS AND AN OLEFIN POLYMERIZATION CATALYST

[75] Inventors: Minoru Terano; Hirokazu Soga; Masuo Inoue, all of Kanagawa, Japan

[73] Assignee: Toho Titanium Co., Ltd., Tokyo, Japan

[21] Appl. No.: 289,551

[22] Filed: Dec. 23, 1988

[30] Foreign Application Priority Data

Dec. 26, 1987 [JP] Japan .................. 62-328385

[51] Int. Cl.$^5$ .............................................. C08F 4/649
[52] U.S. Cl. ..................................... 502/125; 526/124
[58] Field of Search ............................................. 502/125

[56] References Cited

U.S. PATENT DOCUMENTS

| | | | |
|---|---|---|---|
| 4,565,798 | 1/1986 | Yamamoto et al. | 502/125 X |
| 4,579,919 | 4/1986 | Staiger et al. | 502/125 X |
| 4,710,482 | 12/1987 | Job | 502/125 X |
| 4,780,443 | 10/1988 | Matsuura et al. | 502/125 X |
| 4,804,648 | 2/1989 | Job | 502/125 X |

*Primary Examiner*—Patrick P. Garvin
*Attorney, Agent, or Firm*—Birch, Stewart, Kolasch & Birch

[57] ABSTRACT

A solid catalyst component prepared by admixing and reacting, with a reaction product which has been obtained by suspending diethoxymagnesium in an alkylbenzene and bringing the suspension into contact with titanium tetrachloride in an amount less than 1 in terms of volume ratio to the alkylbenzene, a phthaloyl dichloride at a temperature within the range between 80° C. and 125° C., washing the resultant solid substance with an alkylbenzene, and reacting the solid substance in the presence of an alkylbenzene with titanium tetrachloride in an amount less than 1 in terms of volume ratio to the alkylbenzene as well as an olefin polymerization catalyst which comprises (A) the above specified solid catalyst component, (B) a silicon compound of the general formula: $SiR_m(OR')_{4-m}$ wherein R is a group selected from an alkyl group, a cycloalkyl group, an aryl group and vinyl group, R' is an alkyl group and m is zero or an integer of 1–3, with the proviso that when m is 2 or 3, plural R groups may be identical or different, that when m is zero or 1, plural R' groups may be identical or different and/or that when R is an alkyl group, R may be identical with or different from R', and (C) an organoaluminum compound of the general formula: $R''_nAlX_{3-n}$ wherein R'' is an alkyl group, X is a halogen atom and n is an integer of 1–3, with the proviso that when n is 2 or 3, plural R'' groups may be identical or different. This catalyst exhibits an extremely high polymerization activity combined with a high stereospecific performance and enables the production of stereoregular olefin polymers with a negligible residual chlorine content in a high yield.

7 Claims, No Drawings

SOLID CATALYST COMPONENT FOR THE POLYMERIZATION OF OLEFINS AND AN OLEFIN POLYMERIZATION CATALYST

BACKGROUND OF THE INVENTION

1. Field of the Invention

The present invention relates to a high performance solid catalyst component and an olefin polymerization catalyst using same. More particularly, the present invention relates to a solid catalyst component derived from diethoxymagnesium, titanium tetrachloride and a phthaloyl dichloride in the presence of an alkylbenzene according to a specific procedure and an olefin polymerization catalyst comprising the solid catalyst component, a specific silicon compound and a specific organoaluminum compound, the catalyst being capable of exhibiting an extremely high polymerization activity combined with a high stereospecific performance and producing stereoregular olefin polymers substantially free of any residual chlorine in a high yield.

2. Description of the Prior Art

In recent years, a solid catalyst component comprising magnesium chloride as a support and a titanium compound or the like transition metal compound is widely used for olefin polymerization catalysts. In the use of such solid catalyst component, existence of a halogen contained therein gives a bad influence on the nature of the produced polymer and/or causes corrosion of the apparatus for producing the polymers. In order to eliminate such halogen contained in the polymer, a deashing treatment is additionally needed for the polymerization process, which however, increases the production cost remarkably, thus making the process economically unattractive. Accordingly, the use of such solid catalyst component involves many problems to be solved. To overcome the drawbacks resulting from the use of magnesium chloride, various kinds of solid catalyst components derived from a dialkoxymagnesium, titanium tetrachloride and an electron donor as well as olefin polymerization catalysts comprised of such solid catalyst component have been developed and proposed for the polymerization of olefins. In Japanese Laid open patent appln. No. Sho. 55-152710 and U.S. Pat. No. 4,414,132, for example, there is disclosed the use of a large amount of an organoaluminum compound at the time of polymerization of olefins to enhance activity of such catalysts as well as a process for preparing a catalyst component by bringing a dialkoxymagnesium obtained according to a specific operation into contact with a tetravalent titanium compound in the presence of a halogenated hydrocarbon and an electron donor with the purpose of overcoming drawbacks seen in the prior art processes that stereospecific property of the resultant polymers is deteriorated when hydrogen is added to the polymerization system to control the molecular weight of the produced polymers.

In Japanese Laid-open patent appln. No. Sho. 52-98076, 53-2580, 57-63309 and 61-197607, for example, there is disclosed a process for preparing a solid catalyst component wherein an alkoxymagnesium compound is used in combination with a titanium compound and an electron donor.

However, the solid catalyst components prepared according to the processes illustrated in these prior arts cannot be said to be satisfactory in their catalytic performance. At present, the following five characteristics are required for the solid catalyst components or olefin polymerization catalysts comprised of such solid catalyst components:

(1) High level of polymerization activity
(2) High stereospecific performance
(3) Neither contamination of the produced polymer nor corrosion of the apparatus used for the polymerization
(4) No deterioration of the catalytic activity with the lapse of polymerization time
(5) High bulk specific gravity of the produced polymer.

Heretofore, however, there has not et been found any solid catalyst component or olefin polymerization catalyst which succeeds in satisfying all of these five characteristics.

As a result of extensive research, the present inventors already developed an olefin polymerization catalyst which comprises a piperidine derivative, an organoaluminum compound and a solid catalyst which has been prepared by adding a dialkoxymagnesium and a diester of an aromatic dicarboxylic acid to a halogenated hydrocarbon to form a suspension and adding the suspension to a titanium halide to effect reaction (Japanese Laid-open patent appln. No. Sho. 61-108611) and succeeded in furnishing the catalyst with an extremely high polymerization activity and durability of such high activity. However, this catalyst still fails to satisfy all of the above characteristics completely.

Under the above mentioned circumstances, there is still a great demand for developing a new solid catalyst component and a new olefin polymerization catalyst which satisfy all of the above characteristics now required in the industry for the polymerization of olefins.

BRIEF SUMMARY OF THE INVENTION

Accordingly, it is an object of the present invention to provide a new solid catalyst component for olefin polymerization catalysts which exhibits an extremely high polymerization activity combined with a high stereospecific performance.

It is another object of the present invention to provide a new solid catalyst component for olefin polymerization catalysts which is obtained according to a series of specific but simple treatments.

It is still another object of the present invention to provide a new olefin polymerization catalyst possessing durable high performance catalytic activity.

It is further object of the present invention to provide a new olefin polymerization catalyst which overcomes drawbacks of the prior art catalysts incurring problems of corrosion of apparatus and environmental pollution.

It is still further object of the present invention to use the catalyst for the production of highly stereoregular olefin polymers substantially free of any residual chlorine.

Other and further objects, features and advantages of the present invention will be apparent more fully from the following description.

As a result of further extensive research made by the present inventors for developing a new olefin polymerization catalyst overcoming the disadvantages of the prior art catalysts and possessing more improved catalytic performance, it has now been found that a high performance new solid catalyst component can be obtained from diethoxymagnesium, titanium tetrachloride and phthaloyl dichloride according to a series of special treatments under specific conditions and that a new olefin polymerization catalyst which satisfy all of the above mentioned characteristics (1)-(5) can be prepared by combining the new solid catalyst component with a specific silicon compound and a specific organoaluminum compound. The present invention has been accomplished on the basis of the above finding.

DETAILED DESCRIPTION OF THE INVENTION

In accordance with one embodiment of the present invention, there is provided a solid catalyst component for olefin polymerization catalyst, prepared by admixing and reacting, with a reaction product which has been obtained by suspending diethoxymagnesium (a) in an alkylbenzene (b) and bringing the suspension into contact with titanium tetrachloride (c) in an amount less than 1 in terms of volume ratio to the alkylbenzene (b), a phthaloyl dichloride (d) at a temperature within the range between 80° C. and 125° C., washing the resultant solid substance with an alkylbenzene, and reacting the solid substance in the presence of an alkylbenzene (b) with titanium tetrachloride in an amount less than 1 in terms of volume ratio to the alkylbenzene (b).

In accordance with another embodiment of the present invention, there is provided an olefin polymerization catalyst which comprises:
(A) the solid catalyst component referred to above,
(B) a silicon compound of the general formula:

$$SiR_m(OR')_{4-m} \qquad (I)$$

wherein R is a group selected from an alkyl group, a cycloalkyl group, an aryl group and vinyl group, R' is an alkyl group and m is zero or an integer of 1-3, with the proviso that when m is 2 or 3, plural R groups may be identical or different, that when m is zero or 1. plural R' groups may be identical or different and/or that when R is an alkyl group, R may be identical with or different from R', and
(C) an organoaluminum compound of the general formula:

$$R''_n AlX_{3-n} \qquad (II)$$

wherein R" is an alkyl group, X is a halogen atom and n is an integer of 1-3, with the proviso that when n is 2 or 3, plural R" groups may be identical or different.

In the present invention, the particular factors specified herein, i.e. a combination of the sorts of the reactants and solvents, the proportion of the reactants and solvents, the order of adding the reactants in the system, and the range of temperature is important for achieving the solid catalyst component and the olefin polymerization catalyst possessing expected high performance and catalytic activity. If the preparation of the solid catalyst component is carried out under the conditions outside the specified range or not in accordance with the specified order of the treatments, the polymerization activity and the stereospecific performance will be reduced so that the yield of the stereoregular polymer will be decreased and/or the content of residual chlorine in the polymer will be increased.

The diethoxymagnesium (a) used as reactant for the preparation of the solid catalyst component is commercially available as a pure reagent but is easily prepared prior to actual use according to a method known per se.

The alkylbenzene (b) used for suspending the diethoxymagnesium (a) has one or more straight or branched chain alkyl groups on the benzene ring. The alkyl moiety has preferably 1-8 carbon atoms. The alkylbenzene (b) is widely commercially available. Illustrative of the alkylbenzene (b) are, for example, toluene, xylene, ethylbenzene, propylbenzene, iscpropylbenzene and trimethylbenzene. The use of toluene or xylene is preferable.

The titanium tetrachloride (c) used as reactant is commercially available as a pure reagent but is easily prepared according to a method known per se.

The phthaloyl dichloride (d) used as reactant can be prepared from phthalic acid, for example, by reacting it with thionyl chloride or the like chlorinating agent.

The silicon compound (B) of the general formula (I) used in the present invention can be prepared according to methods known per se from the corresponding starting compounds. The alkyl group in this compound may be linear or branched and generally has 1-8, preferably 1-4 carbon atoms. Preferable examples of the alkyl group include methyl, ethyl propyl, isopropyl, n-butyl and isobutyl. The cycloalkyl group generally has 5-8, preferably 5-6 carbon atoms. Preferable examples of the cycloalkyl group include cyclopentyl and cyclohexyl. The aryl group generally includes phenyl or naphthyl group which may carry one or more ring substituents. Illustrative of such aryl group are phenyl, tolyl, xylyl and naphthyl. When m is zero, the silicon compound is a tetraalkoxysilane wherein 4 alkoxy groups may be the same or different. When m is Z, the two R groups and the two R' groups may be respectively same or different When m is 1 or 3, the three R groups or the three R' groups may be respectively same or different. The plural R or R' groups are preferably identical because of easiness in preparing the silicon compound.

Accordingly, the silicon compound preferably includes tetraalkoxysilane, alkylalkoxysilane, phenylalkoxysilane, phenylalkylalkoxysilanes, cycloalkylalkoxysilanes, cycloalkylalkylalkoxysilanes, cycloalkylphenylalkoxysilanes, cycloalkylalkylphenylalkoxysilanes, and the corresponding silanes wherein either of the alkyl, cycloalkyl and phenyl groups is replaced by vinyl group. Illustrative of the tetraalkoxysilane are, for example, tetramethoxysilane, tetraethoxysilane, tetrapropoxysilane and tetrabutoxysilane. Illustrative of the alkylalkoxysilane are, for example, trimethoxyethylsilane, trimethoxymethylsilane, dimethyldimethoxysilane, triethylmethoxysilane and trimethylmethoxysilane. Illustrative of the alkylalkoxysilane are, for example, trimethoxyethylsilane, trimethoxymethylsilane, triethoxymethylsilane, ethyltriethoxysilane, ethyltriisopropoxysilane. Illustrative of the phenylalkoxysilane are, for example, phenyltrimethoxysilane, phenyltriethoxysilane, phenyltripropoxysilane, phenyltriisopropoxysilane, diphenyldimethoxysilane, diphenyldiethoxysilane and triphenylmethoxysilane. Illustrative of the cycloalkylalkoxysilane are, for example, cyclohexyltrimethoxysilane, dicyclopentyldimethoxysilane and tricyclohexyl ethoxysilane. Besides these compounds, examples of the silicon compound include phenyl(methyl)dimethoxysilane, cyclohexyl(ethyl)phenylmethoxysilane, dicyclohexyldiethoxysilane. vinyltrimethoxysilane, winyl(dimethyl)methoxysilane, and vinyl(cyclohexyl)methyl methoxysilane. A mixture of these silicon compounds may also be used.

The organoaluminum compound (C) of the general formula (II) is commercially available as a pure reagent, but may be prepared prior to actual use according to methods known per se. The alkyl group on this compound may be linear or branched and generally has 1-8, preferably 1-4 carbon atoms, while the halogen atom is preferably a chlorine or bromine atom. Thus, the organoaluminum compound includes a trialkylaluminum, a dialkylaluminum halide and an alkylaluminum dihalide as well as a mixture of these aluminum compounds. Preferable examples of the organoaluminum compound include triethylaluminum, tripropylaluminum, triisopropylaluminum, tributylaluminum, triisobutylaluminum, diethylaluminum chloride, diethylaluminum bromide, diisopropylaluminum chloride, dibutylaluminum chloride, ethylaluminum dichloride, propylaluminum dichloride and butylaluminum chloride. Particularly preferable are trialkyl aluminums with triethylaluminum and triisobutylaluminum being most preferable.

The solid catalyst component of the present invention is prepared according to a specific process from the essential ingredients (a), (b), (c) and (d). First of all, diethoxymagnesium (a) is suspended in the alkylbenzene (b) normally in an amount sufficient enough to form a suspension of the ingredient (a) at ambient temperature. The diethoxymagnesium (a) can easily be suspended in the alkylbenzene by using a mechanical means such as stirrer or an ultrasonic vibration device. The suspension thus formed is then brought into contact under agitation with titanium tetrachloride (c) usually at ambient temperature. The amount of the titanium tetrachloride is so adjusted that it is less than 1 in terms of volume ratio to the alkylbenzene (b) and is at least 1.0 g per 1.0 gram of the diethoxymagnesium (a). If the above proportions are greater or smaller than the above ranges, the polymerization activity and the yield of stereoregular polymers will be reduced but the polymerization itself will proceed without any trouble. As the treatments for forming the suspension and for the contact with the ingredient (c) are conducted at ambient temperature by the aid of a simple device, the operations are simple and easy and bring about economical advantages. The reaction product thus obtained was then heated to a temperature of 80°-125° C. and a given amount of phthaloyl dichloride (d) was added thereto. The phthaloyl dichloride is usually used in an amount of 0.1-0.5 ml per 1.0 g of the diethoxymagnesium. The mixture was stirred while maintaining the temperature at 80°-125° C. No particular limitation exists for the reaction time, but the reaction is continued until it is finished. Usually, a period of time from 10 minutes to 10 hours will be sufficient for completion the reaction. If the temperature becomes lower than 80° C., the bulk density of the polymer and the yield of the stereoregular polymer will adversely be influenced. The upper limit of the reaction temperature is established in consideration of the boiling point of the titanium tetrachloride. After completion of the reaction, the resultant solid substance is separated from the reaction liquid by decantation or the like means and washed with a proper amount of an alkylbenzene which may be identical with or different from the alkylbenzene (b) used for forming the suspension of diethoxymagnesium (a). No particular limitation exists in the temperature for washing the solid substance. Prior to the washing with the alkylbenzene, the solid substance may be washed preliminarily with any suitable inert organic solvent other than the alkylbenzene. Preferable examples of the inert organic solvent include benzene and aliphatic hydrocarbons such as n-heptane.

After the washing treatment, the solid substance is reacted in the presence of the alkylbenzene (b) with further titanium tetrachloride (c) in an amount less than 1 in terms of volume ratio to the alkylbenzene (b). No particular limitation exists in reaction temperature for this reaction but the reaction is preferably carried out at a temperature within the range of 80°-125° C. for a period of 10 minutes to 10 hours. A preferable temperature range for this reaction is suitably chosen according to the sort of the alkylbenzene (b) used for this reaction. It is preferred that the alkylbenzene (b) used for forming the suspension of diethoxymagnesium (a) is identical with that used for the second reaction with titanium tetrachloride (c), considering the recovery after the treatment. A series of these treatments in the preparation of the solid catalyst component are usually carried out in a confined reaction container equipped with a stirrer and a means for heating and cooling the reaction container externally and in the absence of air and moisture to prevent any deterioration of the quality of the solid catalyst component. Accordingly, it is convenient to replace the air in the reaction container by nitrogen.

The solid catalyst component thus obtained may be washed further, if necessary, with an inert organic solvent such as n-heptane. The solid catalyst component is used as such for the preparation of an olefin polymerization catalyst or may be stored in dry state, in wet state or in an inert organic solvent for a prolonged period of time without any reduction in its catalytic performance.

The solid catalyst component (A) thus prepared is combined with the silicon compound (B) of the general formula (I) and the organoaluminum compound (C) of the general formula (II) to prepare an olefin polymerization catalyst of this invention. In the preparation of the catalyst, the organoaluminum compound (C) is used in an amount of 1-1000, preferably 10-500, in terms of a molar ratio to the titanium atom contained in the solid catalyst component (A). On the other hand, the silicon compound (B) is used in an amount of 0.01-0.5 in terms of a molar ratio to the organoaluminum compound (C). If the amount of the organoaluminum compound (C) is less than 1 in terms of the molar ratio, the catalyst performance of the resultant catalyst will be reduced. On the other hand, no additional advantage will be obtained if the amount exceeds 1000 in terms of the molar ratio. Thus, the upper limit of the amount of the organoaluminum compound (C) is set only for the economical reasons. If the silicon compound (B) is employed in an amount of less than 0.01 in terms of the molar ratio, isotacticity of the resultant polymer will be reduced, i.e. the yield of the crystalline polymer will be decreased. On the other hand, if the amount of the silicon compound (B) exceeds 0.5 in terms of the molar ratio, an undesirable problem will arise in the catalytic activity of the resultant catalyst.

By the term "polymerization" is meant herein any type of the polymerizations including homopolymerization and copolymerization of olefins as well as any mode of the polymerization including gas or bulk polymerization in the absence of any polymerization solvent and slurry or solution polymerization in the presence of a polymerization solvent. The olefin utilizable for the polymerization is $C_1$-$C_4$ α-olefins and involves ethylene, propylene, 1-butene and a mixture of these olefins. Such olefin can be used in either gaseous or liquid state.

The polymerization of olefins by the aid of the catalyst of the present invention can be carried out according to a usual method for the gas or bulk polymerization or for the slurry or solvent polymerization. The polymerization temperature adopted in this case is lower than 200° C., preferably lower than 100° C., while the polymerization pressure is less than 100 kg/cm².G, preferably less than 50 kg/cm².G. These conditions generally vary according to the sort of olefins, the type of polymerization adopted and can be selected suitably by those skilled in the art, taking into consideration the various factors for polymerization and incidental economical problems.

It is one of the characteristic features of this invention that olefin polymers produced by the aid of the catalyst of this invention have an extremely high stereoregularity. Further, the catalyst of this invention is quite free of any ester such as an ester of aromatic carboxylic acid, so that the problem of odor in the resultant polymer is completely solved. In the present invention, there is no need of adding any ester in the preparation of the solid catalyst component or at the time of polymerization.

In the production of olefin polymers in commercial scale, the bulk density of the produced polymer is taken up as a very important problem in view of the capacities of the production in the polymerization apparatus and of the after-treatments. It is another characteristic feature of this invention that the catalyst of this invention gives polymers of high bulk specific gravity and serves to solve this problem.

It is still another characteristic feature of this invention that the amount of titanium tetrachloride used for the preparation of the solid catalyst component is extremely small as compared with the prior art olefin polymerization catalysts. Titanium tetrachloride easily undergoes decomposition by the action of oxygen and moisture in the air to evolve gaseous hydrogen chloride which is very corrosive to the apparatus used and hazardous to human health so that the handling of this material is tremendous. Accordingly, decrease in the amount of titanium tetrachloride attained by the present invention brings about a great industrial advantage in the preparation of the solid catalyst component, especially in the aspects of reduction of production cost, easiness in the operations and prevention of any environmental pollution.

As the catalyst of this invention exhibits a very high level of activity never expected from the prior arts, the residual amount of the catalyst in the resultant polymer can be controlled to an extremely low level. Accordingly, the amount of a residual chlorine in the resultant polymer is extremely small so that any influence of chlorine on the polymer can be eliminated to such a degree that any deashing treatment is quite unnecessary as after-treatment.

In the conventional highly active supported catalysts for the polymerization of olefins, there is a common drawback shown by considerable reduction in activity per unit time of the catalyst with the lapse of time. In the catalyst of this invention, it is a great merit that the expected reduction in the activity with the lapse of time is extremely low so that the catalyst can advantageously be used even in such case that polymerization time must be extended for copolymerization of olefins where a long period of time is required.

It is generally admitted in the production of olefin polymers in industrial scale, that hydrogen is allowed to be co-existent in the polymerization system to control the melt index of the resultant polymer. However, the prior art catalyst comprising a catalyst component involving magnesium halide as carrier and an ester of a monocarboxylic acid has such a drawback that its activity and stereospecific performance are seriously deteriorated in the co-existence of hydrogen in the polymerization system. In contrast, the catalyst of the present invention achieves a significant merit that its catalytic activity and stereospecific performance are scarcely deteriorated in case of performing the polymerization of olefins in the coexistence of hydrogen even if the melt index of the resultant polymer is extremely high. Such a technical effect is strongly demanded by those skilled in the art. Thus, the catalyst of the present invention contributes greatly in the production of stereoregular olefin polymers with a high bulk density in a higher yield.

The present invention will now be illustrated in more detail by way of Examples and Comparative Examples.

EXAMPLE 1

[Preparation of a solid catalyst component]

In a 500 ml round-bottomed flask equipped with a stirrer, the air in which had sufficiently been replaced by nitrogen, were placed 10 g of diethoxymagnesium and 60 ml of toluene. The mixture was stirred to make it in suspended state. To this suspension was added 40 ml of $TiCl_4$ and, after elevating the temperature of the mixture up to 90° C., 2.0 ml of phthaloyl dichloride was added thereto. The mixture was then heated up to 115° C. and reacted together for 2 hours under agitation. After completion of the reaction, the solid substance was separated and washed twice with 200 ml of toluene kept at 90° C. To the product thus treated were added freshly 60 ml of toluene and 40 ml of $TiCl_4$, and the mixture was reacted together for 2 hours at 115° C. under agitation. After completion of the reaction, the solid reaction product was collected by filtration and washed 10 times each with 200 ml of n-heptane kept at 40° C. The titanium content of the solid catalyst component thus obtained was measured whereupon the content was determined as 3.59% by weight.

[Polymerization]

In a 2.0 liter autoclave provided with a stirring device, the air in which had been replaced entirely by nitrogen, were placed 200 mg of triethylaluminum, 45 mg of diphenyldimethoxysilane and 5.0 mg of the above mentioned solid catalyst component. The autoclave was then charged with 1.8 liters of gaseous hydrogen and 1.4 liters of liquefied propylene, and the mixture was maintained for 30 minutes at 70° C. to effect polymerization of propylene. After completion of the polymerization, the resultant polymer was collected by filtration and dried at 80° C. under reduced pressure, and the amount of the polymer obtained was designated arbitrarily as (A). This polymer was extracted with boiling n-heptane for 6 hours to obtain a polymer insoluble in n-heptane, and the amount of this polymer was designated arbitrarily as (B). The polymerization activity (C) per solid catalyst component used is calculated according to the following equation:

$$(C) = \frac{(A) (g)}{\text{Amount of the solid catalyst component (g)}}$$

The yield of the total crystalline polymer (D) is calculated according to the following equation:

$$(D) = \frac{(B)}{(A)} \times 100 (\%)$$

A result of the experiment obtained is shown in Table 1 below wherein (E) stands for the amount of residual chlorine in the resultant polymer, (F) for the melt index (MI) of the resultant polymer and (G) for the bulk specific gravity of the resultant polymer.

EXAMPLE 2

An experiment was carried out in the same manner as described in Example 1 except that the polymerization time was 1 hour. A result of the experiment obtained is shown in Table 1.

EXAMPLE 3

[Preparation of a solid catalyst component]

In a 500 ml round-bottomed flask equipped with a stirrer, the air in which had been replaced sufficiently by nitrogen, were placed 10 g of diethoxymagnesium and 80 ml of toluene. The mixture was stirred to make it in suspended state. To this suspension was then added 20 ml of $TiCl_4$ and, after elevating the temperature of the mixture up to 90° C., 2.0 ml of phthaloyl dichloride was added thereto. The mixture was then heated up to 115° C. and reacted together for 2 hours under agitation. After completion of the reaction, the solid substance was separated and washed twice with 200 ml of toluene kept at 90° C. To the product thus treated were added freshly 80 ml of toluene and 20 ml of $TiCl_4$, and the mixture was reacted together for 2 hours at 115° C. under agitation. After completion of the reaction, the solid reaction product was collected by filtration and washed 10 times each with 200 ml of n-heptane kept at 40° C. The titanium content of the solid catalyst component thus obtained was measured hereupon the content was determined as 3.75% by weight.

[Polymerization]

Using the solid catalyst component obtained as above, an experiment for the polymerization of propylene was carried out in the same manner as described in Example 1. A result of the experiment obtained is shown in Table 1.

EXAMPLE 4

[Preparation of a solid catalyst component]

In a 500 ml round-bottomed flask equipped with a stirrer, the air in which had been replaced sufficiently by nitrogen, were placed 10 g of diethoxymagnesium and 60 ml of toluene. The mixture was stirred to make it in suspended state. To this suspension was then added 40 ml of $TiCl_4$ and, after elevating the temperature of the mixture up to 90° C., 2.5 ml of phthaloyl dichloride was added thereto. Thereafter, the mixture as heated up to 115° C. and reacted together for 2 hours under agitation. After completion of the reaction, the solid substance was separated and washed twice with 200 ml of toluene kept at 90° C. To the product thus treated were added freshly 60 ml of toluene and 40 ml of $TiCl_4$, and the mixture was reacted together for 2 hours at 115° C. under agitation. After completion of the reaction, the solid reaction product was collected by filtration and washed 10 times each with 200 ml of n-heptane kept at 40° C. The titanium content of the solid catalyst component thus obtained was measured whereupon the content was determined as 3.71% by Weight.

[Polymerization]

Using the solid catalyst component obtained as above, an experiment for the polymerization of propylene was carried out in the same manner as described in Example 1. A result of the experiment obtained is shown in Table 1.

EXAMPLE 5

[Preparation of a solid catalyst component]

In a 500 ml round-bottomed flask equipped with a stirrer, the air in which had been substituted sufficiently with nitrogen, were placed 10 g of diethoxymagnesium and 60 ml of xylene. The mixture was stirred to make it in suspended state. To this suspension was then added 40 ml of $TiCl_4$ and, after elevating the temperature of the mixture up to 90° C., 2.0 ml of phthaloyl dichloride was added thereto. The mixture was then heated up to 115° C. and reacted together for 2 hours under agitation. After completion of the reaction, the solid substance was separated and washed twice with 200 ml of xylene kept at 90° C. To the product thus treated were added freshly 60 ml of xylene and 40 ml of $TiCl_4$, and the mixture was reacted together for 2 hours at 115° C. under agitation. After completion of the reaction, the solid reaction product was collected by filtration and washed 10 times each with 200 ml of n-heptane kept at 40° C. The titanium content of the solid catalyst component thus obtained was measured whereupon the content was determined as 3.50% by weight.

[Polymerization]

Using the solid catalyst component obtained as above, an experiment for the polymerization of propylene was carried out in the same manner as described in Example 1. A result of the experiment obtained is shown in Table 1.

EXAMPLE 6

[Preparation of a solid catalyst component]

In a 500 ml round-bottomed flask equipped with a stirrer, the air in which had been replaced sufficiently by nitrogen, were placed 10 g of diethoxymagnesium and 60 ml of toluene. The mixture was stirred to make it in suspended state. To this suspension was then added 40 ml of $TiCl_4$ and, after elevating the temperature of the mixture up to 90° C., 2.5 ml of phthaloyl dichloride was added thereto. The mixture was then heated up to 115° C. and reacted together for 2 hours under agitation. After completion of the reaction, the solid substance was separated and 200 ml of toluene was added thereto and the solid substance was washed twice under reflux. To the product thus treated was then added freshly 60 ml of toluene and 40 ml of $TiCl_4$, and the mixture was reacted together for 2 hours at 115° C. under agitation. After completion of the reaction, the solid reaction product was collected by filtration and washed 10 times each with 200 ml of n-heptane kept at 40° C. The titanium content of the solid catalyst component thus obtained was measured whereupon the content was determined as 2.20% by weight.

[Polymerization]

In a 2.0 liter autoclave provided with a stirring device, the air in which had been replaced entirely by nitrogen, were placed 200 mg of triethylaluminum, 40 mg of diphenyldimethoxysilane and 5.0 mg of the above mentioned solid catalyst component. The autoclave was then charged with 1.8 liters of gaseous hydrogen and 1.4 liters of liquefied propylene, and the mixture was maintained for 30 minutes at 70° C. to effect polymerization of propylene. After completion of the polymerization, the resultant polymer was separated and dried at 80° C. under reduced pressure, and the amount of the polymer obtained was arbitrarily designated as (A). This polymer was extracted with boiling n-heptane for 6 hours to obtain a polymer insoluble in n-heptane, and the amount of this polymer was designated arbitrarily as (B). The polymerization activity (C) per solid catalyst component used is calculated according to the following equation:

$$(C) = \frac{(A) (g)}{\text{Amount of the solid catalyst component (g)}}$$

The yield of the total crystalline polymer (D) is calculated according to the following equation:

$$(D) = \frac{(B)}{(A)} \times 100(\%)$$

A result of the experiment obtained is shown in Table 1 below wherein (E) stands for the amount of residual chlorine in the resultant polymer. (F) for the melt index (MI) of the resultant polymer and (G) for the bulk specific gravity of the resultant polymer.

EXAMPLE 7

An experiment was carried out in the same manner as described in Example 6 except that the polymerization time was 1 hour. A result of the experiment obtained is shown in Table 1.

EXAMPLE 8

[Preparation of a solid catalyst component]

In a 500 ml round bottomed flask equipped with a stirrer, the air in which had been replaced sufficiently by nitrogen, were placed 10 g of diethoxymagnesium and 70 ml of toluene. The mixture was stirred to make it in suspended state. To this suspension was then added 30 ml of TiCl4 and, after elevating the temperature of the mixture up to 90° C., 2.5 ml of phthaloyl dichloride was added thereto. The mixture was then heated up to 115° C. and reacted together for 2 hours under agitation. After completion of the reaction, the solid substance was separated and 200 ml of toluene was added thereto and the solid substance was washed twice under reflux. To the product thus treated was then added freshly 70 ml of toluene and 30 ml of TiCl4, and the mixture was reacted together for 2 hours at 115° C. under agitation. After completion of the reaction, the solid reaction product was collected by filtration and washed 10 times each with 200 ml of n-heptane kept at 40° C. The titanium content of the solid catalyst component thus obtained was measured whereupon the content was determined as 2.26% by weight.

[Polymerization]

Using the solid catalyst component obtained as above, an experiment for the polymerization of propylene was carried out in the same manner as described in Example 6. A result of the experiment obtained is shown in Table 1.

EXAMPLE 9

[Preparation of a solid catalyst component]

In a 500 ml round-bottomed flask equipped with a stirrer, the air in which had been replaced sufficiently by nitrogen, were placed 10 g of diethoxymagnesium and 60 ml of toluene. The mixture was stirred to make it in suspended state. To this suspension was then added 40 ml of TiCl4 and, after elevating the temperature of the mixture up to 90° C., 2.2 ml of phthaloyl dichloride was added thereto. The mixture was then heated up to 115° C. and reacted together for 2 hours under agitation. After completion of the reaction, the solid substance was separated and 200 ml of toluene was added thereto and the solid substance was washed twice under reflux. To the product thus treated was then added freshly 60 ml of toluene and 40 ml of TiCl4, and the mixture was reacted together for 2 hours at 115° C. under agitation. After completion of the reaction, the solid reaction product was collected by filtration and washed 10 times each with 200 ml of n-heptane kept at 40° C. The titanium content of the solid catalyst component thus obtained was measured whereupon the content was determined as 2.16% by weight.

[Polymerization]

Using the solid catalyst component obtained as above, an experiment for the polymerization of propylene was carried out in the same manner as described in Example 6. A result of the experiment obtained is shown in Table 1.

EXAMPLE 10

[Preparation of a solid catalyst component]

In a 500 ml round bottomed flask equipped with a stirrer, the air in which had been replaced sufficiently by nitrogen, were placed 10 g of diethoxymagnesium and 60 ml of xylene. The mixture was stirred to make it in suspended state. To this suspension was then added 40 ml of TiCl4 and, after elevating the temperature of the mixture up to 90° C., 2.5 ml of phthaloyl dichloride was added thereto. The mixture was then heated up to 115° C. and reacted together for 2 hours under agitation. After completion of the reaction, the solid substance was separated and 200ml of xylene was added thereto and the solid substance was washed twice under reflux. To the product thus treated was then added freshly 60 ml of xylene and 40 ml of TiCl4, and the mixture was reacted together for 2 hours at 115° C. under agitation. After completion of the reaction, the solid reaction product was collected by filtration and washed 10 times each with 200 ml of n-heptane kept at 40° C. The titanium content of the solid catalyst component thus obtained was measured hereupon the content was determined as 2.17% by weight.

[Polymerization]

Using the solid catalyst component obtained as above, an experiment for the polymerization of propylene was carried out in the same manner as described in Example 6. A result of the experiment obtained is shown in Table 1.

COMPARATIVE EXAMPLE 1

In this Comparative Example 1, an experiment was carried out in the same manner as described in Example 1 except that magnesium chloride in the same amount was used in place of diethoxymagnesium.

[Preparation of a solid catalyst component]

In a 500 ml round bottomed flask equipped with a stirrer, the air in which had sufficiently been replaced by nitrogen, were placed 10 g of magnesium chloride and 60 ml of toluene. The mixture was stirred to make it in suspended state. To this suspension was added 40 ml of $TiCl_4$ and, after elevating the temperature of the mixture up to 90° C., 2.0 ml of phthaloyl dichloride was added thereto. The mixture was then heated up to 115° C. and reacted together for 2 hours under agitation. After completion of the reaction, the solid substance was separated and washed twice with 200 ml of toluene kept at 90° C. To the product thus treated were added freshly 60 ml of toluene and 40 ml of $TiCl_4$, and the mixture was reacted together for 2 hours at 115° C. under agitation. After completion of the reaction, the reaction product was collected by filtration and washed 10 times each with 200 ml of n-heptane kept at 40° C. The titanium content of the solid catalyst component thus obtained was measured whereupon the content was determined as 0.72% by weight.

[Polymerization]

Using 30 mg of the solid catalyst component obtained as above, an experiment for the polymerization of propylene was carried out in the same manner as described in Example 1. A result of the experiment obtained is shown in Table 1.

COMPARATIVE EXAMPLE 2

In this Comparative Example 2, an experiment for the polymerization of propylene was carried out in the same manner as described in Example 6 except that the order of adding $TiCl_4$ and phthaloyl dichloride used in Example 6 was inversed.

[Preparation of a solid catalyst component]

In a 500 ml round-bottomed flask equipped with a stirrer, the air in which had been substituted sufficiently with nitrogen, were placed 10 g of diethoxymagnesium and 60 ml of toluene. The mixture was stirred to make it in suspended state. To this suspension was then added 2.5 ml of phthaloyl dichloride and, after elevating the temperature of the mixture up to 90° C., 40 ml of $TiCl_4$ was added thereto. The mixture was then heated up to 115° C. and reacted together for 2 hours under agitation. After completion of the reaction, the solid substance was separated and washed twice with 200 ml of toluene under reflux. To the reaction mixture thus treated were then added freshly 60 ml of toluene and 40 ml of $TiCl_4$, and the mixture was reacted together for 2 hours at 115° C. under agitation. After completion of the reaction, the solid reaction product was collected by filtration and washed 10 times each with 200 ml of n-heptane kept at 40° C. The titanium content of the solid catalyst component thus obtained was measured whereupon the content was determined as 2.29% by weight.

[Polymerization]

Using the solid catalyst component obtained as above, an experiment for the polymerization of propylene was carried out in the same manner as described in Example 6. A result of the experiment obtained is shown in Table 1.

COMPARATIVE EXAMPLE 3

In this Comparative Example 3, an experiment for the polymerization of propylene was carried out in the same manner as described in Example 6 except that $SiCl_4$ was used in place of $TiCl_4$. A result of the experiment obtained is shown in Table 1.

[Preparation of a solid catalyst component]

In a 500 ml round bottomed flask equipped with a stirrer, the air in which had been replaced sufficiently by nitrogen, were placed 10 g of diethoxymagnesium and 60 ml of toluene. The mixture was stirred to make it in suspended state. To this suspension was then added 40 ml of $SiCl_4$ and, after elevating the temperature of the mixture up to 82° C., 2.5 ml of phthaloyl dichloride was added thereto. The mixture was reacted together for 2 hours under agitation while maintaining the above temperature. After completion of the reaction, the solid substance was separated and 200 ml of toluene was added thereto and the solid substance was washed twice under reflux. To the product was then added freshly 60 ml of toluene and 40 ml of $TiCl_4$, and the mixture was reacted together for 2 hours at 115° C. under agitation. After agitation. After completion of the reaction, the reaction product was collected by filtration and washed 10 times each with 200 ml of n-heptane kept at 40° C. The titanium content of the solid catalyst component thus obtained was measured whereupon the content was determined as 0.73% by weight.

[Polymerization]

Using 30 mg of the solid catalyst component obtained as above, an experiment of the polymerization of propylene was carried out in the same manner as described in Example 6. A result of the experiment obtained is shown in Table 1.

TABLE 1

|  | Example | | | | | | | | | | Comparative Example | | |
|---|---|---|---|---|---|---|---|---|---|---|---|---|---|
|  | 1 | 2 | 3 | 4 | 5 | 6 | 7 | 8 | 9 | 10 | 1 | 2 | 3 |
| Amount of the total polymers (A) (g) | 99.3 | 170.1 | 91.5 | 95.1 | 94.2 | 155.1 | 243.5 | 152.5 | 169.0 | 146.0 | 114.0 | 42.5 | 12.0 |
| Amount of the polymer soluble in boiling n-heptane (g) | 2.3 | 3.9 | 2.0 | 2.0 | 2.2 | 2.5 | 3.9 | 2.3 | 3.2 | 2.6 | 35.9 | 1.0 | 0.6 |
| Amount of the polymer insoluble in boiling n-heptane (B) (g) | 97.0 | 166.2 | 89.5 | 93.1 | 92.0 | 153.6 | 239.6 | 150.2 | 165.8 | 143.4 | 78.1 | 41.5 | 11.4 |
| Polymerization activity per solid catalyst component (C) | 19860 | 34020 | 18300 | 19020 | 18840 | 31220 | 48700 | 30500 | 33800 | 29200 | 3800 | 8500 | 400 |

TABLE 1-continued

| | Example | | | | | | | | | | Comparative Example | | |
|---|---|---|---|---|---|---|---|---|---|---|---|---|---|
| | 1 | 2 | 3 | 4 | 5 | 6 | 7 | 8 | 9 | 10 | 1 | 2 | 3 |
| Yield of the total crystalline polymer (D) (%) | 97.7 | 97.7 | 97.8 | 97.9 | 97.7 | 98.4 | 98.4 | 98.5 | 98.1 | 98.2 | 68.5 | 97.7 | 94.7 |
| Amount of the residual chlorine in the resultant polymer (E) (ppm) | 30 | 18 | 33 | 32 | 32 | 19 | 12 | 20 | 18 | 21 | 160 | 70 | — |
| Melt index of the resultant polymer (F) | 5.0 | 5.2 | 3.8 | 5.6 | 3.2 | 3.6 | 3.1 | 5.1 | 5.8 | 5.5 | 7.8 | 3.9 | — |
| Bulk density of the resultant polymer (G) | 0.42 | 0.44 | 0.43 | 0.43 | 0.43 | 0.42 | 0.43 | 0.42 | 0.42 | 0.43 | 0.25 | 0.46 | — |

In view of the results shown in Table 1, it is evident that the solid catalyst components of the present invention obtained in Examples 1-10 are extremely higher in polymerization activity (and also in yield of the polymer) than those obtained in Comparative Examples 1-3. In addition, it is noted that the content of residual chlorine is very high in the polymer obtained in Comparative Example 1 wherein $MgCl_2$ is used in place of the dialkylmagnesium and in Comparative Example 2 wherein the preparation of the solid catalyst component is not in accordance with the specific procedure of the present invention.

It is understood that the preceding representative examples may be varied within the scope of the present specification both as to reactants and reaction conditions, by one skilled in the art to achieve essentially the same results.

As many widely different embodiments of this invention may be made without departing from the spirit and scope thereof, it is to be construed that this invention is not limited to the specific embodiments thereof except as defined in the appended claims.

What is claimed is:

1. A solid catalyst component for olefin polymerization catalysts, prepared by
   (1) bringing a suspension which has been obtained by suspending diethoxymagnesium (a) in an alkylbenzene (b), into contact with titanium tetrachloride (c) in an amount less than 1 in terms of volume ratio to said alkylbenzene (b) to form a mixture of (a), (b) and (c);
   (2) adding phthaloyl dichloride (d) to said mixture at a temperature within the range of between 80° C. and 125° C. to form a whole mixture;
   (3) maintaining the temperature of said whole mixture within the above range for a period of time of from about 10 minutes to 10 hours to form a solid substance;
   (4) washing said resultant solid substance with an alkylbenzene; and
   (5) reacting said solid substance in the presence of an alkylbenzene (b) with titanium tetrachloride in an amount less than 1 in terms of volume ratio to the alkylbenzene (b).

2. A solid catalyst component according to claim 1, wherein said titanium tetrachloride (c) brought into contact with the suspension in step (1) is used in an amount of at least 1.0 g per 1.0 g of said diethoxymagnesium (a).

3. A solid catalyst component according to claim 1, wherein said phthaloyl dichloride (d) is used in an amount of 0.1-0.5 ml per 1.0 g of said diethoxymagnesium (a).

4. A solid catalyst component according to any one of claims 1, 2, or 3, wherein said alkylbenzene (b) is selected from toluene, xylene, ethylbenzene, propylbenzene and trimethylbenzene.

5. An olefin polymerization catalyst which comprises:
   (A) the solid catalyst component for olefin polymerization catalyst as claimed in any one of claims 1, 2, or 3;
   (B) a silicon compound of the general formula:

$$SiR_m(OR')_{4-m} \qquad (I)$$

wherein R is selected from an alkyl group, a cycloalkyl group, an aryl group and vinyl group, R' is an alkyl group and m is zero or an integer of 1-3, with the proviso that when m is 2 or 3, plural R groups may be identical or different, or that when m is zero or 1, plural R' groups may be identical or different and/or that when R is an alkyl group, R' may be identical with or different from R', and
   (C) an organoaluminum compound of the general formula:

$$R''_n AlX_{3-n} \qquad (II)$$

wherein R'' is an alkyl group, X is a halogen atom and n is an integer of 1-3, with the proviso that when n is 2 or 3, plural R'' groups may be identical or different.

6. An olefin polymerization catalyst according to claim 5, wherein said organoaluminum compound (C) is used in an amount of 1-1000 in terms of a molar ratio to the titanium atom contained in said solid catalyst component (A).

7. An olefin polymerization catalyst according to claim 5, wherein said silicon compound (B) is used in an amount of 0.01-0.5 in terms of a molar ratio to the organoaluminum compound (C).

* * * * *